United States Patent [19]

Symmons

[11] 3,960,016

[45] June 1, 1976

[54] WATER MIXING VALVE WITH TEMPERATURE INDICATOR

[75] Inventor: Paul C. Symmons, Duxbury, Mass.

[73] Assignee: Symmons Industries, Inc., Braintree, Mass.

[22] Filed: Feb. 14, 1974

[21] Appl. No.: 442,327

[52] U.S. Cl. ............................... 73/343 R; 73/349; 137/359; 236/94
[51] Int. Cl.² .................... G01K 1/14; G05D 23/13
[58] Field of Search .............. 73/349, 363.5, 343 R; 137/597, 551, 559, 359; D23/31; D8/141, 142; 236/12 R, 94

[56] References Cited
UNITED STATES PATENTS

| | | | |
|---|---|---|---|
| 2,244,759 | 6/1941 | Bogardus | 73/343 R |
| 2,308,127 | 1/1943 | Symmons | 137/99 |
| 2,355,736 | 8/1944 | Klein | 137/359 |
| 2,534,378 | 12/1950 | Schlaich | 73/349 |
| 2,603,091 | 7/1952 | Lamb | 73/343 R |
| 2,624,512 | 1/1953 | Rickenback | 236/12 |
| 2,648,226 | 8/1953 | Finch | 73/343 X |
| 3,178,150 | 4/1965 | Johnson | 137/551 |
| 3,448,755 | 6/1969 | Symmons | 137/597 |
| D186,994 | 1/1960 | Dreyfuss | D23/31 |
| D186,995 | 1/1960 | Dreyfuss | D23/31 |
| D213,779 | 4/1969 | DuBois | D23/31 |

FOREIGN PATENTS OR APPLICATIONS 1,739 1883 United Kingdom................... 236/12

*Primary Examiner*—Richard C. Queisser
*Assistant Examiner*—Daniel M. Yasich
*Attorney, Agent, or Firm*—Schiller & Pandiscio

[57] ABSTRACT

A plumbing fixture comprising a manually operable hot and cold water mixing valve and a temperature sensor mounted to the mixing valve and to the escutcheon for indicating the temperature of the mixed water.

6 Claims, 3 Drawing Figures

WATER MIXING VALVE WITH TEMPERATURE INDICATOR

This invention relates to improvements in non-scald mixing valves and more particularly to improvements in mixing valves for showers and bath installations.

Non-scald mixing valves using water pressure equalizing valves as provided in my U.S. Pat. Nos. 2,308,127, 3,099,996 and 3,448,755 have achieved extensive commercial success because they have effectively eliminated the danger of accidental scalding resulting from a rapid change in water temperature as a consequence of a variation in water pressure. However, there is still a danger of scalding if too high a water temperature is selected initially.

A principal object of the invention is to provide a plumbing fixture combining a mixing valve with means for measuring the temperature of the mixed water.

Another object is to provide a mixing valve with means for visually indicating the temperature of the mixed water.

The foregoing and other objects are achieved by a preferred embodiment of the invention which consists of a mixing valve having a water temperature sensor in the discharge chamber of the valve body. Indicator means associated with the sensor are provided for indicating the temperature of the mixed water. Other features and many of the attendant advantages of the invention are described or rendered obvious by the following detailed description which is to be considered together with the accompanying drawings, wherein.

Figure 1:
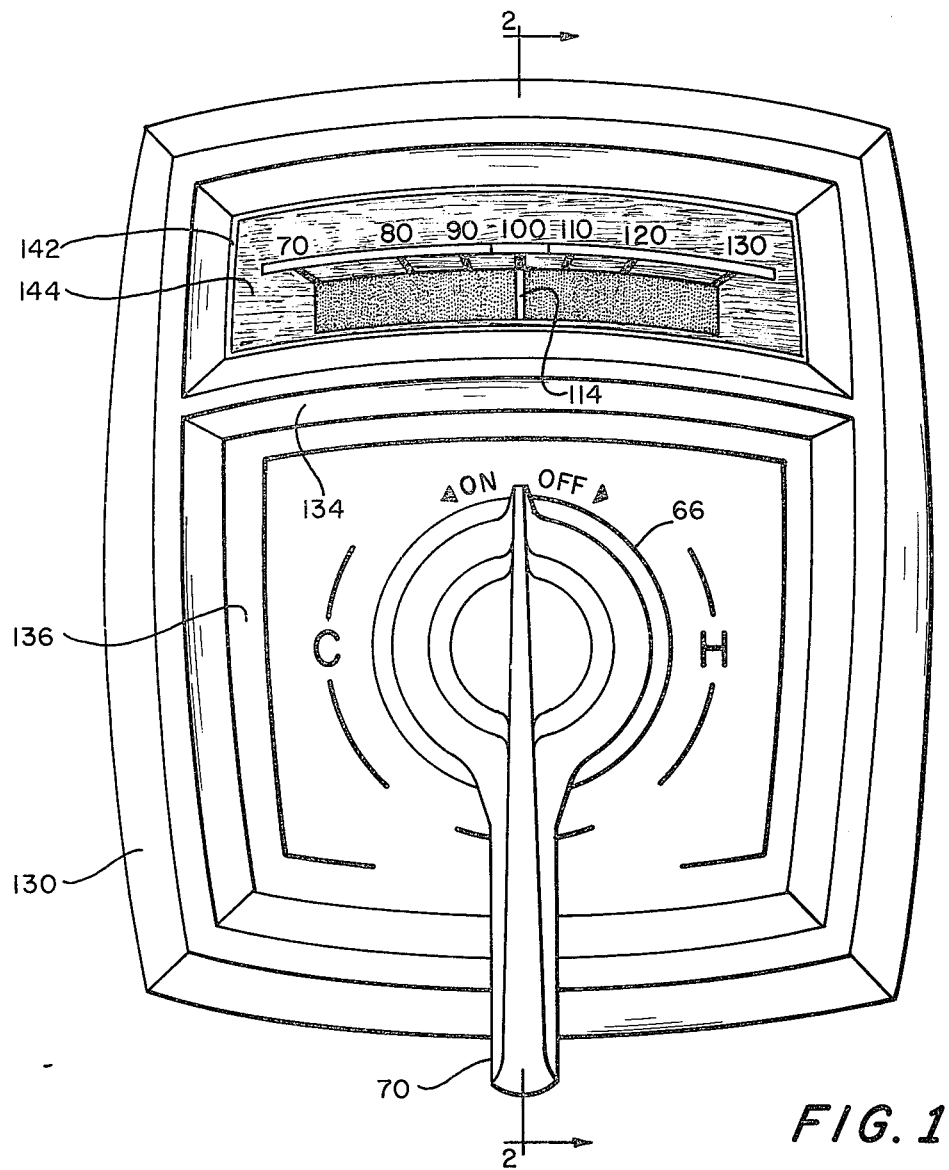
FIG. 1 is a front view in elevation of a plumbing fixture constituting a preferred embodiment of the invention.
Figure 3:
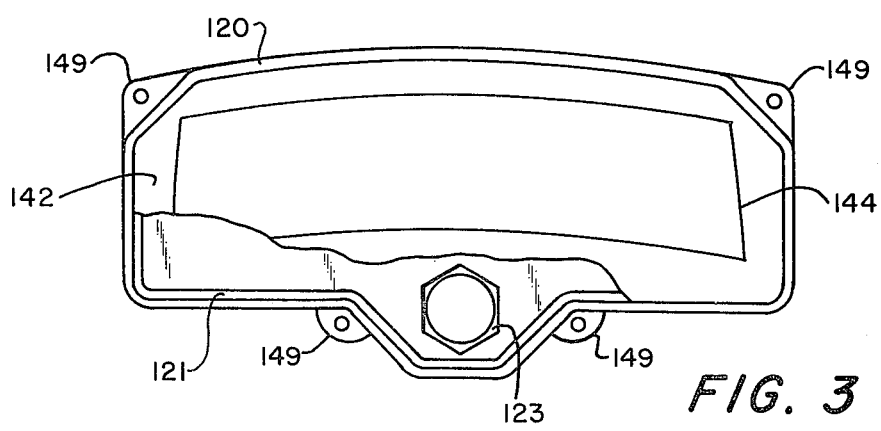
FIG. 3 is a front view in elevation, with one element broken away, of the thermometer housing which forms part of the fixture of FIGS. 1 and 2.
Figure 2:
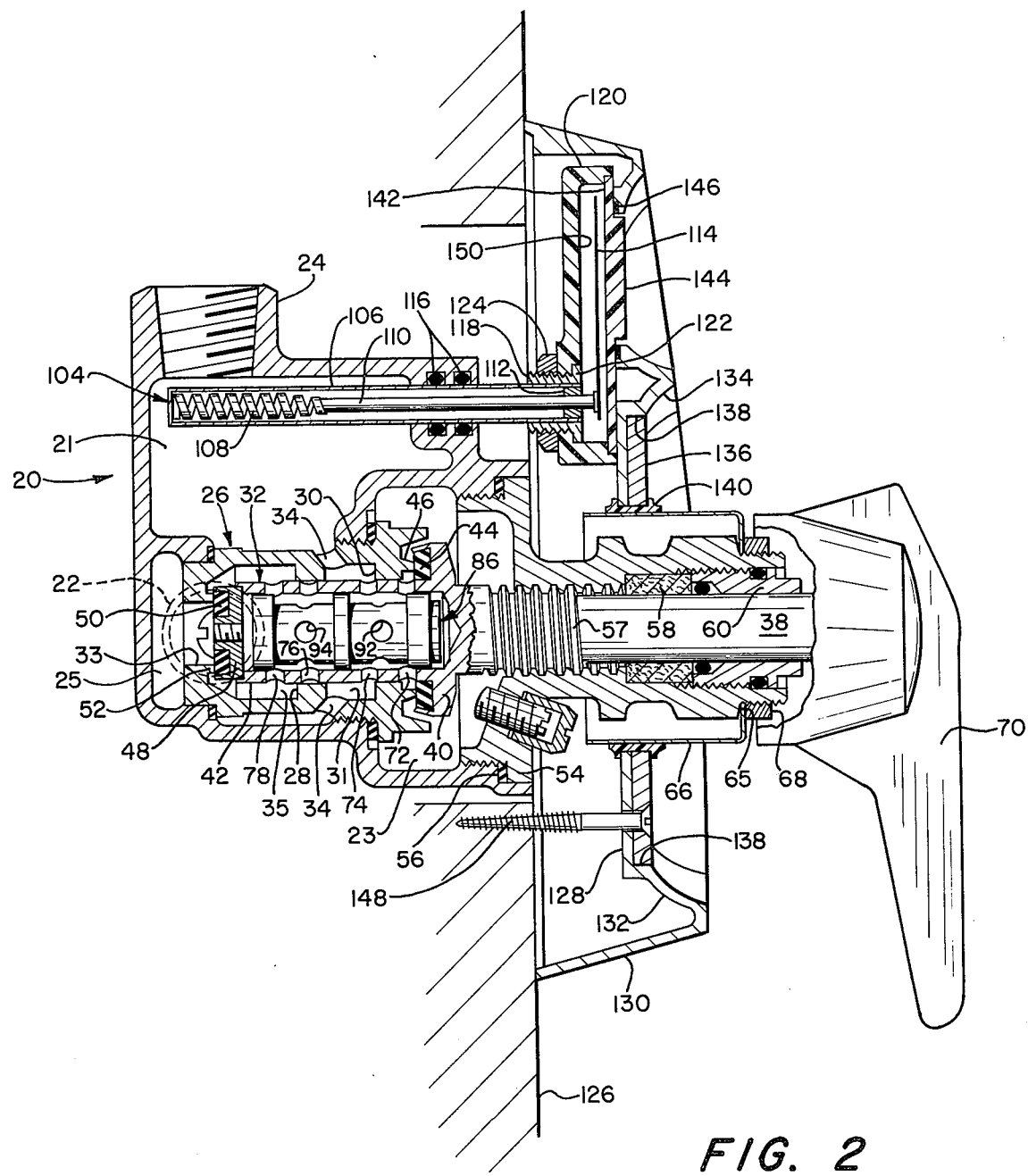
FIG. 2 is a detailed longitudinal section of the same fixture mounted in a wall, the section being taken along line 2—2 of FIG. 1.

Referring now to FIGS. 1–3, the preferred embodiment of the invention comprises a mixing valve unit of a type well known in the art. The valve comprises a valve body 20 in the form of a cored casting having one hollow boss 24 that serves as a mixed water outlet and two additional hollow bosses that serve as hot and cold water inlets. It is to be noted that only one inlet boss 22 is shown (in phantom in FIG. 2) and that the second inlet boss is disposed on the opposite side of valve body 20. The two inlet bosses are preferably internally threaded to facilitate connection to hot and cold water supply pipes and the outlet boss is similarly threaded for connection to a pipe leading to a shower head or tub spout. Outlet boss 24 communicates with a mixed water discharge or outlet chamber 21 formed in valve body 20. Inlet boss 22 communicates with a cold water inlet chamber 23 formed in the valve body. The other inlet boss (not shown) communicates with a hot water inlet chamber 25 formed in the valve body.

The valve body supports internally a substantially cylindrical main valve casing identified generally at 26 which is formed with two bearing sections 28 and 30 which act as guides for the hollow cylindrical valve section 42 of a main valve identified generally at 32. The end of main valve casing 26 nearest bearing section 30 is provided with an annular extension 46 that acts as a valve seat for a valve head 40. The opposite end of main valve casing 26 is provided with a port 33 which communicates with hot water inlet chamber 25. The bearing sections 28 and 30 and main valve 32 coact to form a valve chamber 31 in valve casing 26 which communicates with the discharge chamber 21 by means of a plurality of ports 34. A second valve chamber 35 is formed between bearing section 28 and the adjacent end of valve casing 26.

The main valve 32 is formed integral with a valve stem 38 and comprises valve section 42 and an enlarged valve head 40. Valve head 40 carries a washer 44 adapted to engage valve seat 46 on main valve casing 26. Valve head 40 and seat 46 coact to control admission of cold water to casing 26. The bottom end of valve section 42 is closed by an integral plug valve 48 having a washer 50 adapted to engage an annular valve seat 52 which surrounds port 33. Plug valve 48 and seat 52 coact to control admission of hot water to valve chamber 35 in casing 26.

The upper end of the valve body 20 has a relatively large aperture which is threaded to receive a bonnet 54. The latter is screwed tightly into the valve body 20 with a suitable gasket 56 interposed between the two members so as to prevent leakage. Bonnet 54 has an axial bore provided with internal threads which are engaged by complementary threads 57 on valve stem 38. It also is provided with a tapped counterbore to receive a suitable packing 58 which is compressed by a bushing 60 screwed into the bonnet and acts as a gland to prevent leakage of fluid around stem 38. The outer end of bonnet 54 has a reduced diameter so as to provide a shoulder 65 which act as a stop for a cup-shaped member 66 that functions as a dome or centering support for an escutcheon provided in accordance with this invention. Member 66 is locked in place by a nut 68 which screws onto the reduced diameter outer end of bonnet 54.

A handle 70 is mounted on the upper end of valve stem 38. By virtue of the construction above described, rotative movement of handle 70 will cause valve stem 38 to rotate and also to move longitudinally relative to bonnet 54, thereby moving the main valve 32 in the same manner relative to main valve casing 26. Rotation of handle 70 counterclockwise (as seen in FIG. 1) will cause valve head 40 to rise off of valve seat 46 and plug valve 48 to rise off of valve seat 52.

The cylindrical section 42 of main valve 32 is provided with four sets of holes 72, 74, 76 and 78. Each set of holes preferably consists of at least two diametrically opposed holes, but a larger number of holes may be provided in each set. The essential thing is that all of the holes in a given set are located in a common plane extending transversely of cylindrical section 42. The sets of holes are arranged so that with valve heads 40 and 48 closed on seats 46 and 52, holes 78 are to the left of bearing section 28 in communication with valve chamber 35, holes 76 are blocked by bearing 28, holes 74 are to the left of bearing section 30 in communication with valve chamber 31, and holes 72 are to the right of bearing section 30.

If handle 70 is turned open about ¼ of a revolution, valve heads 40 and 48 will move off of their respective valve seats. However, only cold water will be able to flow through the mixing valve. The cold water will flow into the main valve from cold water inlet chamber 23 via holes 72, out of the main valve into valve chamber 31 via holes 74, out of the valve chamber 31 into the outlet chamber 21 via holes 34, and out of outlet chamber 21 via outlet boss 24. Hot water flow will be prevented because the holes 76 will still be blocked by bearing section 28. If the handle is turned about an additional ¼ revolution, both hot and cold water will flow through the valve. At this point, half of the openings 74 will be blocked by bearing section 30, half of the holes 76 will be blocked by bearing section 28, and holes 72 and 78 will be unblocked. If the handle is turned fully open (almost another ½ revolution), the holes 74 will be fully blocked by bearing section 30 and the holes 76 and 78 will be fully open to valve chambers 31 and 35. Accordingly, only hot water will be able to flow through the valve via chambers 35 and 31 and holes 78 and 76. Various intermediate settings of the handle will provide for different size outlet areas, i.e. different exposures of holes 74 and 76. It is believed to be apparent from the foregoing description that to the extent described, the illustrated device permits selection of mixed water temperatures in the complete range between cold inlet water temperature and hot inlet water temperature, and the selected mixed water temperature will remain fixed so long as the hot and cold water pressures remain steady.

The mixed water temperature is held steady despite fluctuations in inlet water pressures by means of a pressure equalizing valve 86 which is slidably disposed within and forms part of the main valve assembly. The piston valve 86 is a cylindrical member sized to make a close sliding fit with the tubular section 42 of the main valve assembly, and preferably it is constructed as described and illustrated in my U.S. Pat. No. 3,448,755. The piston valve is provided with two circumferentially extending peripheral grooves that coact with tubular section 42 to define two annular chambers. Additionally, the piston valve is formed with two axial blind bores at its opposite ends. Although these bores are not illustrated, it is to be appreciated that one bore is open to one of the two annular chambers by way of suitable holes 92 formed in the piston valve; the other axial bore is open to the other annular chamber by way of holes 94 in the piston valve. Typically there are four holes 92 and 94 arranged in quadrature relation with each other. The hot and cold water inlet ports 78 and 72 of valve 32 are closable in varying amounts by the equalizing piston valve according to fluctuations in water pressure. As shown, piston valve 86 is located at the midpoint of its possible length of travel within valve 32, so that it blocks off about half of the effective areas of inlet ports 72 and 78. As cold water is supplied via hole 72, it will pass through the holes 92 into one end of piston valve 86, and simultaneously hot water supplied through inlet port 78 will flow through the holes 94 into the other end of valve 86. Accordingly, the opposite ends of the piston valve will be influenced by the hot and cold water pressures. These opposing fluid pressures cause the piston valve to move in one direction or the other depending upon the change in pressure of one or both of the fluids. When the cold water pressure drops, the equalizing piston valve 86 will move toward the valve head 40 so as to close off more of the hot water inlets 78 and unblock more of the cold water inlets 72. The reverse action occurs if there is a relative drop in hot water pressure. By virtue of such action, the delivery of scalding fluid is prevented and the opposing fluid pressures of the cold and hot water will automatically position the equalizing piston valve so as to maintain constant the temperature of mixed water delivered to the discharge chamber 20.

To the extent already described, the structure illustrated in the drawings is old and constitutes a mixing valve constructed in accordance with the teachings of my prior U.S. Pat. No. 2,308,127, 3,099,996 and 3,448,755. Further details of construction of the main valve and the equalizing piston valve, which may be varied, are provided by the aforesaid U.S. Patents and are incorporated herein by reference.

In accordance with the present invention, the above-described mixing valve is provided with a temperature sensor-indicator mounted for measuring and indicating the temperature of the mixed water discharged via outlet port 24. Various types of temperature sensor-indicator means capable of operating within the contemplated temperature range may be used. Preferably, the temperature sensor-indicator 104 is a bi-metallic thermometer of conventional construction. As an alternative measure, a pressure spring thermometer may be used as the temperature sensor. For further information regarding suitable temperature sensors, reference may be had to Eckman, Industrial Instrumentation, pp. 34–40, J. Wiley & Sons (1960).

In this case, the temperature sensor indicator is a bi-metallic thermometer 104 comprising an outer case 106, a bi-metallic element 108 wound in a helix and having one end permanently fastened to case 106 and the other end attached to a stem 110 that is rotatably supported in the case by a bearing 112. A pointer 114 is attached to the outer end of the stem. Of course, the case 106 is formed of a water-corrosion resistant material. The case 106 is mounted in the wall of valve casing 20 and extends into outlet chamber 21 as shown. A pair of O-rings 116 are installed as seals to prevent water from leaking out between the thermometer case 106 and valve casing 20.

The outer end of case 106 is through in a bushing 118 which in turn is mounted thorugh a hole in a dish-shaped housing 120 which preferably is made of plastic. Bushing 118 has an enlarged hex head 122 that is seated in a similarly shaped counterbore 123 in the rear wall of housing 120, and a nut 124 on bushing 118 clamps the head 122 tight against the housing.

As is obvious to a person skilled in the art, the mixing valve is usually mounted within a hollow building wall 126 and an escutcheon is usually coupled to the valve so as to conceal the valve body. In this case the escutcheon comprises a plate 128 that is joined to a rim or flange 130 by a connecting flange 132. Rim 130 engages the front surface of wall 126 and holds plate 128 away from the wall as shown.

Plate 128 is subdivided into two discrete areas by a rib 134 which coacts with flange 130 to establish two frames which provide relief for and thus set off the two areas. The larger area is provided with a circular aperture so that it can fit over and be centered by cup-shaped member 66. Overlying this large area of plate 128 is a transparent plate 136 which is shaped so as to engage a surrounding shoulder 138 provided by flange 130 and rib 134. Plate 136 fits over member 66 and is held tight aganist plate 128 by a plastic or rubber sealing ring 140 which tightly surrounds member 66. The smaller area of plate 128 has a second generally rectangular aperture to allow visual inspection of a face plate 142 which is mounted to housing 120. The side walls of housing 120 are grooved as shown at 121 so as to provide a seat for face plate 142. The latter is transparent and may be made of glass or a clear plastic. Face plate 142 is cemented or otherwise secured to housing 120 so that the pointer is hermetically sealed off. Face plate 142 is oversized with respect to the rectangular aperture in plate 128, but has a relatively thick section 144 which extends into the aperture and engages the surrounding edge of plate 128. A gasket 146 is interposed between housing 120 and plate 128 to prevent water from leaking between them. Housing 120 is secured to the escutcheon by means of screws. For this purpose, housing 120 is formed with perforated ears 149 (FIG. 3) to accommodate mounting screws (not shown) that are screwed into tapped holes in plate 128. The escutcheon may be held in place by virtue of a friction fit between sealing ring 140 and member 66 and also by the interlocking fit of housing 120 and plate 128. However, if desired, a screw 148 may be used to lock the escutcheon to the building wall as shown or to a portion of valve casing 20.

The mixing valve assembly also includes indicia in connection with handle 70 and pointer 114. As is evident from FIG. 1, the valve is opened and the mixed water temperature is increased by turning handle 70 clockwise. The indicia associated with handle 70 may be applied to the rear surface of clear face plate 136 or to the adjacent front surface of plate 128.

As seen in FIG. 1, the indicia associated with pointer 114 is a temperature scale. The latter may be applied to the rear surface of face plate 142 or to the forward face 150 of the base of housing 120. In each case the indica may be applied to the supporting surface directly by a suitable printing technique or may be printed on a paper sheet or like substrate which is affixed to an appropriate supporting surface of face plate 136 or 142, plate 128 or housing 120. If desired the plate 136 may be opaque and the indicia for handle 70 printed on the front face of plate 136. Still other modes of applying appropriate indicia for handle 70 and pointer 114 will be obvious to persons skilled in the art.

It will be appreciated from the foregoing description that the present invention provides an added measure of safety to mixing valves for showers and baths since the user can determine the mixed water temperature without having to touch the water.

Another advantage is that the use of O-rings to provide a seal between the thermometer case and the valve casing allows the former to be moved axially related to the latter, so that the escutcheon can be moved up tight against the building wall. It is to be noted also that the temperature sensor and indicator means and the escutcheon form a discrete sub-assembly and that in removing the escutcheon the thermometer may be pulled out of valve body 20 due to the slip connection between case 106 and O-ring 116. If desired the holes in ears 149 may be threaded and the escutcheon may be provided with holes so that the mounting screws for housing 120 may be applied from the front side of the escutcheon, whereby by removing such screws it would be possible to remove the escutcheon without removing the thermometer unit from valve body 20.

Obviously, many other modifications and variations of the present invention are possible in view of the above teachings. Thus, for example, valve body 20 may be provided with a threaded hole which leads to outlet chamber 21 and O-rings 116 may be mounted in a bushing that is screwed into such hole, with the thermometer case extending through the bushing into outlet chamber 21 and O-rings 116 serving to prevent leakage between the thermometer case and the bushing. Such a modification facilitates installation of the O-rings and also, by varing the inner diameter of the bushing, permits use of thermometers of different case sizes. Also, the invention is applicable to other types of single lever mixing valves for showers and bath, e.g. mixing valves which do not employ means for compensating for changes in water pressure. Still other advantages and modifications are believed to be apparent to persons skilled in the art from the foregoing description of the invention.

What is claimed is:

1. A plumbing fixture comprising:
   a mixing valve for mixing hot and cold water adapted for mounting in a wall, said valve including a valve body with hot and cold water inlets, a control member extending into said valve body for selecting the relative amounts of hot and cold water passing through said valve, and an outlet chamber in said valve body for discharging water mixed in said valve;
   a water temperature sensor disposed in said outlet chamber in position to sense the temperature of water in said chamber;
   temperature indicator means coupled to said sensor for indicating the water temperature in said outlet chamber, said temperature indicator means being disposed outside of said valve body and comprising a temperature scale and a movable pointer which is mechanically connected to said sensor so that said pointer will move relative to said scale in accordance with changes in the temperature of the water in said outlet chamber sensed by said sensor;
   an escutcheon for concealing said valve when it is mounted in a wall;
   means for attaching said escutcheon to said valve; and means mounting said indicator means to said escutcheon so that said indicator means may be be viewed by an observer.

2. A plumbing fixture as defined by claim 1 wherein said temperature indicator means is disposed behind said escutcheon and said escutcheon has an opening for viewing said temperature indicator means.

3. A plumbing fixture as defined in claim 2 wherein said control member comprises a rotatable stem and a handle attached to said rotatable stem, said stem extending through a second opening in said escutcheon.

4. A plumbing fixture as defined by claim 1 wherein said temperature sensor comprises a bi-metallic member and said pointer is mechanically connected to said bi-metallic member, and further wherein said temperature scale is disposed on a flat surface which extends substantially parallel to said escutcheon.

5. A plumbing fixture comprising:
   a mixing valve for mixing hot and cold water adapted for mounting in a wall, said valve including a valve body with hot and cold water inlets, a control member for selecting the relative amounts of hot and cold water passing into said valve via said inlets, and an outlet chamber in said valve body for discharging water mixed in said valve;
   a water temperature sensor disposed in said outlet chamber in position to sense the temperature of water in said chamber;
   temperature indicator means disposed outside of said valve body for indicating the water temperature in said outlet chamber, said temperature indicator means comprising a temperature scale, a movable pointer, and means mechanically connecting said pointer to said sensor for moving said pointer relative to said scale in accordance with the water temperature sensed by said sensor in said outlet chamber;

an escutcheon for concealing said valve body when it is mounted in a wall, said escutcheon having an opening for viewing said temperature indicator means; and means for attaching said escutcheon to said valve.

6. A plumbing fixture according to claim 5 wherein said temperature indicator means comprises a housing with a transparent face and said temperature scale and pointer are disposed in said housing and are visible through said transparent face, and further wherein said housing is disposed between said valve body and said escutcheon.

* * * * *